(12) United States Patent
Li et al.

(10) Patent No.: US 12,513,727 B2
(45) Date of Patent: Dec. 30, 2025

(54) INTERFERENCE REPORTING METHOD AND APPARATUS

(71) Applicant: HUAWEI TECHNOLOGIES CO., LTD., Shenzhen (CN)

(72) Inventors: Shengyu Li, Beijing (CN); Lei Guan, Beijing (CN); Ruijie Li, Beijing (CN); Tong Su, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 359 days.

(21) Appl. No.: 18/190,426

(22) Filed: Mar. 27, 2023

(65) Prior Publication Data
US 2023/0232439 A1    Jul. 20, 2023

Related U.S. Application Data

(63) Continuation of application No. PCT/CN2020/118885, filed on Sep. 29, 2020.

(51) Int. Cl.
| | |
|---|---|
| *H04W 72/541* | (2023.01) |
| *H04B 17/336* | (2015.01) |
| *H04W 72/0446* | (2023.01) |
| *H04W 72/0453* | (2023.01) |

(52) U.S. Cl.
CPC ........ *H04W 72/541* (2023.01); *H04B 17/336* (2015.01); *H04W 72/0446* (2013.01); *H04W 72/0453* (2013.01)

(58) Field of Classification Search
CPC ...... H04B 17/336; H04L 1/20; H04W 52/146; H04W 52/346; H04W 52/367; H04W 72/0446; H04W 72/0453; H04W 72/541
See application file for complete search history.

(56) References Cited

U.S. PATENT DOCUMENTS

| | | | |
|---|---|---|---|
| 8,483,742 B2 * | 7/2013 | Kim | H04W 52/243 370/252 |
| 10,931,362 B1 * | 2/2021 | Bruzzone | H04B 17/12 |
| 12,167,468 B2 * | 12/2024 | Lei | H04W 74/0833 |
| 12,267,197 B2 * | 4/2025 | Alawieh | H04W 72/0453 |
| 2003/0156659 A1 * | 8/2003 | Hanaoka | H04L 1/0047 375/261 |
| 2007/0160162 A1 * | 7/2007 | Kim | H04B 7/0452 375/267 |
| 2009/0247171 A1 * | 10/2009 | Suga | H04W 72/046 455/447 |

(Continued)

FOREIGN PATENT DOCUMENTS

CN    107733549 A    2/2018

*Primary Examiner* — Dung B Huynh
(74) *Attorney, Agent, or Firm* — Rimon PC (57) ABSTRACT

This application provides an interference reporting method. In the method, a terminal device performs interference measurement on a first time-frequency resource, to obtain an autocorrelation matrix of an interference signal. The terminal device further determines a first interference parameter based on the autocorrelation matrix of the interference signal, and reports the first interference parameter to a network device. Based on the first interference parameter, the network device can restore the autocorrelation matrix of the interference signal obtained by the terminal device. This helps the network device perform more accurate downlink data scheduling.

12 Claims, 3 Drawing Sheets

(56) References Cited

U.S. PATENT DOCUMENTS

| | | | |
|---|---|---|---|
| 2010/0099428 A1 | 4/2010 | Bhushan et al. | |
| 2011/0111766 A1* | 5/2011 | Yang | H04W 52/247 455/452.2 |
| 2011/0237290 A1* | 9/2011 | Nishikawa | H04W 52/54 455/522 |
| 2013/0088986 A1 | 4/2013 | Xiao et al. | |
| 2013/0107791 A1* | 5/2013 | Oh | H04B 7/0452 370/312 |
| 2014/0126403 A1* | 5/2014 | Siomina | H04J 11/005 370/252 |
| 2014/0301493 A1* | 10/2014 | Govindswamy | H04W 24/02 375/267 |
| 2014/0341193 A1* | 11/2014 | Lee | H04W 72/1215 370/336 |
| 2015/0215017 A1* | 7/2015 | Yum | H04L 1/1671 370/328 |
| 2015/0230259 A1* | 8/2015 | Park | H04B 7/086 370/329 |
| 2016/0013903 A1* | 1/2016 | Kim | H04L 1/00 370/329 |
| 2016/0036542 A1* | 2/2016 | Gong | H04W 24/10 370/329 |
| 2016/0087815 A1* | 3/2016 | Balachandran | H04L 25/0256 375/346 |
| 2016/0226538 A1* | 8/2016 | Kim | H04B 1/126 |
| 2016/0234855 A1* | 8/2016 | Panteleev | H04W 36/00692 |
| 2016/0270086 A1* | 9/2016 | Stirling-Gallacher | H04W 72/54 |
| 2016/0285528 A1* | 9/2016 | Wang | H04B 1/525 |
| 2017/0201363 A1* | 7/2017 | Son | H04B 7/0639 |
| 2018/0132270 A1* | 5/2018 | Zeng | H04L 1/1887 |
| 2018/0167836 A1* | 6/2018 | Axmon | H04W 24/10 |
| 2018/0175927 A1* | 6/2018 | Ishizaki | H04B 7/0632 |
| 2018/0183510 A1* | 6/2018 | Lee | H04B 17/345 |
| 2018/0359014 A1* | 12/2018 | Noh | H04W 52/04 |
| 2018/0368017 A1* | 12/2018 | Sundararajan | H04W 52/34 |
| 2019/0166514 A1* | 5/2019 | Liu | H04L 5/0057 |
| 2019/0215044 A1* | 7/2019 | Noh | H04L 5/1469 |
| 2019/0261380 A1 | 8/2019 | Iyer et al. | |
| 2019/0372641 A1* | 12/2019 | Muruganathan | H04B 7/0456 |
| 2019/0373614 A1 | 12/2019 | Yum et al. | |
| 2020/0028654 A1* | 1/2020 | Chen | H04W 24/10 |
| 2020/0028718 A1* | 1/2020 | Wang | H04L 25/0224 |
| 2020/0178107 A1* | 6/2020 | Miao | H04W 24/10 |
| 2020/0266863 A1* | 8/2020 | Muraoka | H04B 7/088 |
| 2020/0358502 A1* | 11/2020 | Faxér | H04W 24/10 |
| 2021/0022026 A1* | 1/2021 | Onggosanusi | H04B 17/327 |
| 2021/0092774 A1* | 3/2021 | Xu | H04W 24/10 |
| 2021/0175937 A1* | 6/2021 | Yamada | H04W 16/28 |
| 2021/0227412 A1* | 7/2021 | Jiang | H04L 5/00 |
| 2021/0243073 A1* | 8/2021 | Pezeshki | H04L 41/16 |
| 2021/0243632 A1* | 8/2021 | Pezeshki | H04W 80/02 |
| 2021/0258749 A1* | 8/2021 | Funaki | H04W 72/23 |
| 2021/0345293 A1* | 11/2021 | Park | H04B 7/08 |
| 2021/0360463 A1* | 11/2021 | Shi | H04B 17/327 |
| 2021/0360642 A1* | 11/2021 | Abedini | H04B 17/345 |
| 2021/0385057 A1* | 12/2021 | Zhou | H04B 17/327 |
| 2021/0400589 A1* | 12/2021 | Yiu | H04W 24/10 |
| 2022/0116128 A1* | 4/2022 | Li | H04L 5/0023 |
| 2022/0174680 A1* | 6/2022 | Hao | H04B 7/0645 |
| 2022/0225337 A1* | 7/2022 | Fan | H04W 24/10 |
| 2022/0264318 A1* | 8/2022 | Nilsson | H04B 7/0452 |
| 2022/0264478 A1* | 8/2022 | Miao | H04W 52/242 |
| 2022/0287094 A1* | 9/2022 | Tooher | H04L 5/0082 |
| 2022/0377792 A1* | 11/2022 | Murakami | G01S 13/003 |
| 2022/0407576 A1* | 12/2022 | Muruganathan | H04L 5/0023 |
| 2023/0189027 A1* | 6/2023 | Huang | H04B 7/0456 370/329 |
| 2023/0208490 A1* | 6/2023 | Kim | H04L 5/0051 370/329 |
| 2023/0208588 A1* | 6/2023 | Hao | H04B 7/0456 370/329 |
| 2023/0232439 A1* | 7/2023 | Li | H04W 72/541 370/329 |
| 2023/0262493 A1* | 8/2023 | Ren | H04L 5/0048 370/252 |
| 2023/0283359 A1* | 9/2023 | Yuan | H04B 17/336 370/329 |
| 2023/0337031 A1* | 10/2023 | Qiao | H04W 24/10 |
| 2024/0283499 A1* | 8/2024 | Chen | H04L 25/0242 |
| 2024/0356593 A1* | 10/2024 | Shi | H04B 17/382 |
| 2025/0062875 A1* | 2/2025 | Hirzallah | H04L 5/0053 |
| 2025/0168079 A1* | 5/2025 | Li | H04B 7/0456 |

\* cited by examiner

INTERFERENCE REPORTING METHOD AND APPARATUS

CROSS-REFERENCE TO RELATED APPLICATIONS

This application is a continuation of International Application No. PCT/CN2020/118885, filed on Sep. 29, 2020, the disclosure of which is hereby incorporated by reference in its entirety.

TECHNICAL FIELD

The present invention relates generally to the field of wireless communications technologies, and specifically, to an interference reporting method and an apparatus.

BACKGROUND

Compared with a 4th generation (4G) mobile communication system, a 5th generation (5G) mobile communication system has a major feature of adding support for an ultra-reliable low-latency communication (URLLC) service. For example, motion control services in smart factories require a loopback latency to be not greater than 1 millisecond. There is a natural contradiction between the URLLC service requirement of low latency and high reliability and the system requirement of high capacity. Low latency means that there are few retransmission opportunities. Therefore, a robust transmission solution (for example, a solution with more resources) needs to be used for URLLC service data to ensure transmission reliability. Consequently, data transmission efficiency is reduced, and a system capacity is further reduced.

SUMMARY

To improve data transmission efficiency, a feasible method is to improve accuracy of interference measurement, to improve a system capacity by using a link adaptation technology.

An embodiment of this application provides an interference reporting method so that a network device can obtain more accurate interference information and perform more accurate downlink data scheduling, and the system capacity can be improved.

According to a first aspect, an interference reporting method is provided. A network device sends first information to a terminal, where the first information indicates a first time-frequency resource. The terminal performs measurement on the first time-frequency resource, to obtain interference information of the terminal on N receive antennas, where N is an integer greater than 1. The terminal sends a first interference parameter to the network device on a second time-frequency resource, where the first interference parameter is determined based on the interference information.

In the foregoing interference reporting method, the network device may recover information of interference the terminal experienced, based on the first interference parameter fed back by the terminal, interference to the terminal, so that the network device can perform more accurate downlink data scheduling, to increase the system capacity.

In a possible implementation of the first aspect, the first interference parameter includes at least one of an interference layer indicator (ILI), an interference matrix indicator (IMI), and an interference strength indicator (ISI). The ILI indicates a value L, L is a nonnegative integer less than or equal to N, the IMI is determined based on a first vector set $\{u_1, u_2, \ldots, u_N\}$, the first vector set includes N vectors, the ISI is determined based on a first value set $\{\lambda_1, \lambda_2, \ldots, \lambda_N\}$, the first value set includes N values, the first value set and the first vector set are determined based on the interference information, and $\lambda_1 \geq \lambda_2 \geq \lambda_N$. A quantity of layers of the interference information and a strength and a direction of each layer are reported. In this way, the network device can completely restore a spatial domain structure (namely, an autocorrelation matrix of an interference signal in the following) of the interference information to facilitate refined spatial domain scheduling. In addition, a quantity of bits required for reporting the interference information can be reduced, and feedback overhead can be reduced.

In a possible implementation of the first aspect, the interference information is an autocorrelation matrix R of interference signals received by the terminal on the N receive antennas, and the first value set and the first vector set meet: $R = U\Sigma U^H$. A matrix $U = [u_1, u_2, \ldots, u_N]$, $\Sigma = \text{Diag}(\lambda_1, \lambda_2, \ldots, \lambda_N)$, $U^H$ represents a conjugate transposed matrix of the matrix U, and $\text{Diag}(\lambda_1, \lambda_2, \ldots, \lambda_N)$ represents a diagonal matrix whose main diagonal elements are $\lambda_1, \lambda_2, \ldots, \lambda_N$. In some embodiments, reporting of the autocorrelation matrix of the interference signal is divided into singular value reporting and singular vector reporting, and a simple and feasible interference reporting method is provided. As such, an existing channel state information reporting framework may still be used to a maximum extent. To be specific, table-based quantization feedback is performed on the singular value, and codebook-based quantization feedback is performed on the singular vector.

In a possible implementation of the first aspect, L is equal to a quantity of elements $\lambda_i$ that are in the first value set and whose values are greater than or equal to a first threshold, and i is a positive integer less than or equal to N. In embodiments of this application, the terminal feeds back only interference strength values of some interference layers with high interference strength, so that feedback overheads can be reduced and the autocorrelation matrix of the interference signal recovered by the network device end is not greatly affected, achieving a good compromise between feedback accuracy and feedback overheads.

In a possible implementation of the first aspect, when L is a positive integer, the ISI includes L interference strength values, the L interference strength values are determined based on a second value set $\{\varphi_1, \varphi_2, \ldots, \varphi_L\}$ the second value set includes L values, a value of an element $\varphi_j$ in the second value set is equal to a ratio of a value of an element $\lambda_j$ in the first value set to a first reference value, and j is a positive integer less than or equal to L.

In a possible implementation of the first aspect, the first reference value is configured by using higher layer signaling; the first reference value is determined based on at least one of receive bandwidth, a thermal noise power spectral density, and a noise factor of the terminal device; the first reference value is reference signal received power obtained by the terminal device through measurement; or the first reference value is determined based on a first channel quality indicator index CQI index and a first mapping relationship, where the first CQI index is a CQI value in a channel state information CSI report associated with the first interference parameter. In embodiments of this application, normalization is first performed on interference signal strength values based on the first reference value, so that distribution of the interference signal strength on a real number axis can be converted into distribution in a region centered on the first reference value, which facilitates subsequent design of a quantization table. By designing a quantization table of a numerical region centered on the first reference value, the interference signal strength may have a small quantization error near the first reference value.

In a possible implementation of the first aspect, a $j^{th}$ interference strength value in the L interference strength values is determined based on a value of an element $\varphi_j$ in the second value set and a second mapping relationship; or a first interference strength value is determined based on an element cpi in the second value set and a second mapping relationship, and an $r^{th}$ interference strength value is determined based on a difference $\varphi_{r-1}-\varphi_r$ between elements $\varphi_{r-1}$ and $\varphi_r$ in the second value set and a third mapping relationship, where r is an integer greater than or equal to 2 and less than or equal to L. Because the interference strength value $\lambda_1, \lambda_2, \ldots, \lambda_N$ decreases (or does not increase) with the increase of the subscript, the value of $\varphi_{r-1}-\varphi_r$ is more concentrated than the value of $\varphi_r$, and quantization of $\varphi_{r-1}-\varphi_r$ under a same quantization bit may provide a smaller quantization error.

In a possible implementation of the first aspect, when L is a positive integer, the ISI includes L+1 interference strength values, a first interference strength value in the L+1 interference strength values is determined based on $\varphi_0$ and a second mapping relationship, $\varphi_0$ is determined based on the second value set $\{\varphi_1, \varphi_2, \ldots, \varphi_L\}$, a $(j+1)^{th}$ interference strength value in the L+1 interference strength values is determined based on a difference $\varphi_j-\varphi_0$ between a value of a $j^{th}$ element $\varphi_j$ in the second value set and $\varphi_0$ and a sixth mapping relationship, an element $\varphi_j$ in the second value set is equal to a ratio of an element $\lambda_j$ in the first value set to a first reference value, and j is a positive integer less than or equal to L. By using overall interference strength feedback and differential interference strength feedback on each interference layer, a fluctuation range of an interference strength value on each interference layer can be reduced, and quantization bit overheads of interference strength feedback on each interference layer can be reduced.

In a possible implementation of the first aspect, the IMI is determined based on a first interference matrix $U_1$ and a first codebook, where the first interference matrix $U_1=[u_1, u_2, \ldots, u_L]$. In this method, interference vectors fed back by the terminal are in a one-to-one correspondence with interference layer strength, that is, the terminal feeds back only interference vectors corresponding to some interference layers with high interference strength, so that feedback overheads can be reduced and the autocorrelation matrix of the interference signal recovered by the network device end is not greatly affected. Also a good compromise between feedback accuracy and feedback overheads is achieved.

In a possible implementation of the first aspect, the first codebook includes N sub-codebooks, an $i^{th}$ sub-codebook in the N sub-codebooks includes at least one matrix, and each matrix in the $i^{th}$ sub-codebook is a matrix of N×i dimensions. The IMI is an index that is in an $L^{th}$ sub-codebook and that is of a second matrix in the $L^{th}$ sub-codebook in the first codebook, and the second matrix is a matrix that is in the $L^{th}$ sub-codebook and that has a smallest difference from the first interference matrix. By using the codebook-based quantization feedback, feedback overheads of the interference vector/matrix can be reduced.

In a possible implementation of the first aspect, the terminal sends a first reference signal to the network device, where a precoding matrix of the first reference signal is an identity matrix; and the terminal sends a second reference signal to the network device, where a precoding matrix of the second reference signal is a first interference matrix $U_I$, and the first interference matrix $U_I=[u_1, u_2, \ldots, U_L]$. The terminal implements implicit feedback of the interference matrix by carrying, on a reference signal, the interference matrix that needs to be fed back. The network device may restore, by separately estimating equivalent channel matrices corresponding to the first reference signal and the second reference signal, a precoding matrix, namely, the interference matrix, carried in the second reference signal. In comparison with codebook-based quantization feedback, more precise feedback can be provided for the interference matrix.

In a possible implementation of the first aspect, both the first reference signal and the second reference signal are sounding reference signals SRSs.

In a possible implementation of the first aspect, the first interference parameter includes the ILI, and the first interference parameter further includes at least one of the IMI and the ISI. The terminal performs coding and modulation on a second interference parameter, and sends the coded and modulated second interference parameter to the network device on a third time-frequency resource. The terminal performs coding and modulation on a third interference parameter, and sends the coded and modulated third interference parameter to the network device on a fourth time-frequency resource. The second interference parameter includes the ILI, and a bit length of the second interference parameter is predefined. The third interference parameter is a parameter other than the second interference parameter in the first interference parameter. The third time-frequency resource and the fourth time-frequency resource are some resources in the second time-frequency resource. The third time-frequency resource is different from the fourth time-frequency resource. Optionally, the second interference parameter further includes a quantity of original information bits of the third interference parameter. Because a value of a quantity of interference layers L is unknown on the network device side in advance, the network device does not know how many values are included in the ISI sent by the terminal, and does not know how many interference vectors (corresponding to certain sub-codebooks) are included in the IMI. Consequently, the network device does not know the quantity of original information bits of these feedback parameters, and it is difficult to perform accurate decoding. In the foregoing independent coding and feedback method, the terminal may first feed back the ILI (namely, the second interference parameter). After obtaining the ILI parameter, the network device may determine the quantity of original information bits of the subsequent ISI and IMI based on the ILI, so that the network device correctly decodes the ILI and the IMI (namely, the third interference parameter).

In a possible implementation of the first aspect, the interference information is an autocorrelation matrix R of interference signals received by the terminal on the N receive antennas, and the first interference parameter includes all elements in a triangular matrix of a matrix R2, where the matrix R2 is a quantization matrix of a matrix R1, and the matrix R1 is determined based on the matrix R and a second reference value. By using element-by-element quantization feedback, refined interference matrix quantization feedback can be implemented. In some scenarios in which interference changes slowly, the first reference parameter may be fed back once in a long periodicity. In this case, using such refined feedback does not cause excessively large feedback overheads. On the other hand, accuracy of the autocorrelation matrix of the interference signal restored by the network device can be improved, and downlink spatial domain scheduling efficiency can be further improved. In addition, because the autocorrelation matrix of the interference signal is a conjugate symmetric matrix, the original autocorrelation matrix of the interference signal can be restored by feeding back only a lower triangular matrix or an upper triangular matrix, so that feedback overheads are reduced.

In a possible implementation of the first aspect, an $(s, t)^{th}$ element $r1_{s,t}$ in the matrix R1 is a ratio of an $(s, t)^{th}$ element $r_{s,t}$ in the matrix R to the second reference value, where s and t are positive integers less than or equal to N.

In a possible implementation of the first aspect, an $(s, t)^{th}$ element $r2_{s,t}$ in the matrix R2 is determined based on the $(s, t)^{th}$ element $r1_{s,t}$ in the matrix R1 and a seventh mapping relationship.

In a possible implementation of the first aspect, an $(s, s)^{th}$ element $r2_{s,s}$ in the matrix R2 is determined based on the $(s, s)^{th}$ element $r1_{s,s}$ in the matrix R1 and an eighth mapping relationship. An $(s, t)^{th}$ element $r2_{s,t}$ in the matrix R2 is determined based on the $(s, t)^{th}$ element $r1_{s,t}$ in the matrix R1 and a seventh mapping relationship, or an $(s, t)^{th}$ element $r2_{s,t}$ in the matrix R2 determined based on $a_{s,t}$ and a seventh mapping relationship, and $$a_{s,t} = \frac{r1_{s,t}}{\sqrt{r1_{s,s} \times r1_{t,t}}}.$$

$r1_{s,s}$ is an $(s, s)^{th}$ element in the matrix R1, $r1_{t,t}$ is a $(t, t)^{th}$ element in the matrix R1, $r1_{s,t}$ is the $(s, t)^{th}$ element in the matrix R1, and s is not equal to t. Because diagonal elements of the interference autocorrelation matrix are real numbers, one mapping relationship may be used separately for quantization feedback, to reduce feedback overheads.

In a possible implementation of the first aspect, the first time-frequency resource is for carrying a first channel state information reference signal (CSI-RS) or is for carrying a first physical downlink shared channel (PDSCH).

In a possible implementation of the first aspect, the first CSI-RS is a zero-power (ZP) CSI-RS; the first CSI-RS is a non-zero-power (NZP) CSI-RS, and the NZP CSI-RS is further for measuring channel information; or the first CSI-RS is a non-zero-power (NZP) CSI-RS, and the NZP CSI-RS is only for measuring the interference information.

According to a second aspect, an event-triggered interference reporting method is provided. A network device sends first configuration information to a terminal, where the first configuration information indicates a first time-frequency resource and a second time-frequency resource. The first time-frequency resource is a time-frequency resource for interference measurement, and the second time-frequency resource is a time-frequency resource for interference reporting. The terminal performs measurement on the first time-frequency resource, to obtain an autocorrelation matrix of interference signals received by the terminal on N receive antennas, where N is an integer greater than 1. When an interference reporting mode is event-triggered aperiodic reporting, and a second condition is met, the terminal sends a first interference parameter to the network device on the second time-frequency resource, where the first interference parameter is determined based on the autocorrelation matrix of the interference signal.

In the foregoing event-triggered interference reporting method, the terminal reports interference to the network device only when a specific condition is met, so that interference reporting overheads are reduced.

In a possible implementation of the second aspect, the first configuration information may further indicate an interference reporting mode. The interference reporting mode includes at least one of periodic reporting, semi-persistent reporting, and aperiodic reporting. The aperiodic reporting includes at least one of DCI-triggered aperiodic reporting and event-triggered aperiodic reporting.

In a possible implementation of the second aspect, when the first configuration information includes a first parameter, or a value of a first parameter is a first preset value, the interference reporting mode is event-triggered aperiodic reporting.

In a possible implementation of the second aspect, the second condition is that a fourth value is greater than or equal to a second threshold, where the fourth value is determined based on an autocorrelation matrix Rm of an interference signal obtained through measurement and an autocorrelation matrix Rr of an interference signal corresponding to a first interference parameter that is recently reported.

In a possible implementation of the second aspect, the second condition is that decoding of a first PDSCH transmitted on the first time-frequency resource fails. The autocorrelation matrix of the interference signal is obtained through measurement on the first PDSCH.

According to a third aspect, an interference tracing method is provided. A first network device sends second configuration information to a terminal, where the second configuration information includes configuration information of a time-frequency resource set, or the second configuration information indicates a time-frequency resource set. A second network device sends a first downlink channel to the terminal on a sixth time-frequency resource, where the first downlink channel carries interference change indication information. The sixth time-frequency resource herein is a time-frequency resource in the foregoing time-frequency resource set. The first downlink channel is a downlink channel sent by the second network device to the terminal. The terminal performs measurement on a first time-frequency resource, to obtain an autocorrelation matrix of interference signals received by the terminal on N receive antennas, where N is an integer greater than 1. The terminal sends a first interference parameter to the first network device on a second time-frequency resource, where the first interference parameter is determined based on the autocorrelation matrix of the interference signal.

In the foregoing interference tracing method, when an interference of the second network device to the terminal changes, the second network device sends the first downlink channel to the terminal, to indicate to the terminal to measure the interference from the second network device, so that the terminal measures the interference only when the interference changes, and the interference reporting overheads of the terminal can be reduced.

According to a fourth aspect, a communication apparatus is provided, including a module (e.g., one or more processors or circuits) configured to implement a function of the terminal or the network device in any one of the first aspect; or the possible implementations of the first aspect; or including a module (e.g., one or more processors or circuits) configured to implement a function of the terminal or the network device in any one of the second aspect or the possible implementations of the second aspect; or including a module (e.g., one or more processors or circuits) configured to implement a function of the terminal or the network device in any one of the third aspect or the possible implementations of the third aspect.

According to a fifth aspect, a communication apparatus is provided. The communication apparatus includes a processor and an interface circuit. The interface circuit is configured to: receive a signal from a communication apparatus other than the communication apparatus and transmit the signal to the processor, or send a signal from the processor to a communication apparatus other than the communication apparatus. The processor is configured to implement a function of the terminal or the network device according to any one of the first aspect or the possible implementations of the first aspect; is configured to implement a function of the terminal or the network device according to any one of the second aspect or the possible implementations of the second aspect; or is configured to implement a function of the terminal or the network device according to any one of the third aspect or the possible implementations of the third aspect, by using a logic circuit or by executing code instructions.

According to a sixth aspect, a computer-readable storage medium is provided. The computer-readable storage medium stores a computer program or instructions. When the computer program or instructions are executed by a communication apparatus, the method according to any one of the first aspect or the possible implementations of the first aspect is implemented, the method according to any one of the second aspect or the possible implementations of the second aspect is implemented, or the method according to any one of the third aspect or the possible implementations of the third aspect is implemented.

According to a seventh aspect, a computer program product including instructions is provided. When the instructions are run by a communication apparatus, the method according to any one of the first aspect or the possible implementations of the first aspect is implemented, the method according to any one of the second aspect or the possible implementations of the second aspect is implemented, or the method according to any one of the third aspect or the possible implementations of the third aspect is implemented.

DESCRIPTION OF EMBODIMENTS

Figure 1:
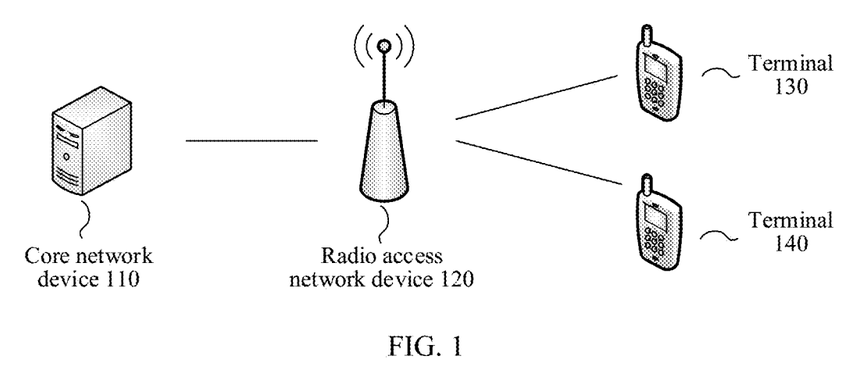
FIG. 1 is a schematic diagram of an architecture of a mobile communication system used in an embodiment of this application.

FIG. 1 is a schematic diagram of an architecture of a mobile communication system used in an embodiment of this application. As shown in FIG. 1, the mobile communication system includes a core network device 110, a radio access network device 120, and at least one terminal (for example, a terminal 130 and a terminal 140 in FIG. 1). The terminal is connected to the radio access network device in a wireless manner, and the radio access network device is connected to the core network device in a wireless or wired manner. The core network device and the radio access network device may be different physical devices that are independent of each other, or functions of the core network device and functions of the radio access network device may be integrated into a same physical device, or some functions of the core network device and some functions of the radio access network device may be integrated into one physical device. The terminal may be located at a fixed position, or may be mobile. FIG. 1 is only a schematic diagram. The communication system may further include another network device, for example, may further include a wireless relay device and a wireless backhaul device, which are not shown in FIG. 1. The quantities of core network devices, radio access network devices, and terminals in the mobile communication system are not limited in this embodiment of this application.

The terminal is connected to the radio access network device in a wireless manner, to access the mobile communication system. The radio access network device may be a base station, an evolved NodeB (eNodeB), a transmission reception point (TRP), a next generation NodeB (gNB) in a 5G mobile communication system, a base station in a future mobile communication system, an access node in a Wi-Fi system, or the like; or may be a module or a unit that implements some functions of the base station, for example, may be a central unit (CU), or may be a distributed unit (DU). A specific technology and a specific device form used for the radio access network device are not limited in this embodiment of this application. In this application, the radio access network device is referred to as a network device for short. Unless otherwise specified, a network device refers to the radio access network device.

The terminal may also be referred to as a terminal device, user equipment (UE), a mobile console, a mobile terminal, or the like. The terminal may be a mobile phone, a tablet computer, a computer having a wireless transceiver function, a virtual reality terminal, an augmented reality terminal, a wireless terminal in industrial control, a wireless terminal in unmanned driving, a wireless terminal in remote surgery, a wireless terminal in a smart grid, a wireless terminal in transportation security, a wireless terminal in a smart city, a wireless terminal in a smart home, or the like. A specific technology and a specific device form used for the terminal are not limited in this embodiment of this application.

The network device and the terminal may be deployed on land, and include an indoor or outdoor device, a handheld device, or a vehicle-mounted device; or may be deployed on water; or may be deployed on a plane, a balloon, and a satellite in air. Application scenarios of the network device and the terminal are not limited in this embodiment of this application.

The network device and the terminal may communicate with each other by using a licensed spectrum, or may communicate with each other by using an unlicensed spectrum, or may communicate with each other by using both a licensed spectrum and an unlicensed spectrum. Communication between the network device and the terminal may be performed by using a spectrum below 6 gigahertz (GHz), a spectrum above 6 GHz, or both a spectrum below 6 GHz and a spectrum above 6 GHz. Spectrum resources used between the network device and the terminal are not limited in this application.

In some embodiments of this application, a time domain symbol may be an orthogonal frequency division multiplexing (OFDM) symbol, or may be a discrete Fourier transform-spread-OFDM (DFT-s-OFDM) symbol. Unless otherwise specified, symbols this application are time domain symbols.

It may be understood that in embodiments of this application, a physical downlink shared channel (PDSCH), a physical downlink control channel (PDCCH), a physical uplink shared channel (PUSCH), and a physical uplink control channel (PUCCH) are merely examples of a downlink data channel, a downlink control channel, an uplink data channel, and an uplink control channel at a physical layer. In different systems and different scenarios, data channels and control channels may have different names. This is not limited in this embodiment of this application.

In embodiments of this application, a function of the network device may alternatively be performed by a module (for example, a chip) in the network device, or may be performed by a control subsystem that implements a function of a base station. The control subsystem that includes a function of a base station may be a control center in an industrial Internet of Things (IoT) application scenario such as a smart grid, factory automation, or intelligent transportation. A function of the terminal may also be performed by a module (for example, a chip) in the terminal.

To communicate with the network device, the terminal needs to establish a wireless connection to a cell controlled by the network device. A cell that establishes a wireless connection to the terminal is referred to as a serving cell of the terminal. When the terminal communicates with the serving cell, the terminal is further interfered by a signal from a neighboring cell. In this application, a signal sent by the network device to the terminal is referred to as a downlink signal, and a radio channel through which the downlink signal passes is referred to as a downlink channel; a signal sent by the terminal to the network device is referred to as an uplink signal, and a radio channel through which the uplink signal passes is referred to as an uplink channel.

As described above, the link adaptation technology may be used to increase system capacity. Specifically, the network device performs downlink data scheduling based on obtained downlink channel state information (CSI), and selects a proper modulation and coding scheme and a spatial domain precoding matrix to perform downlink data transmission.

Figure 2:
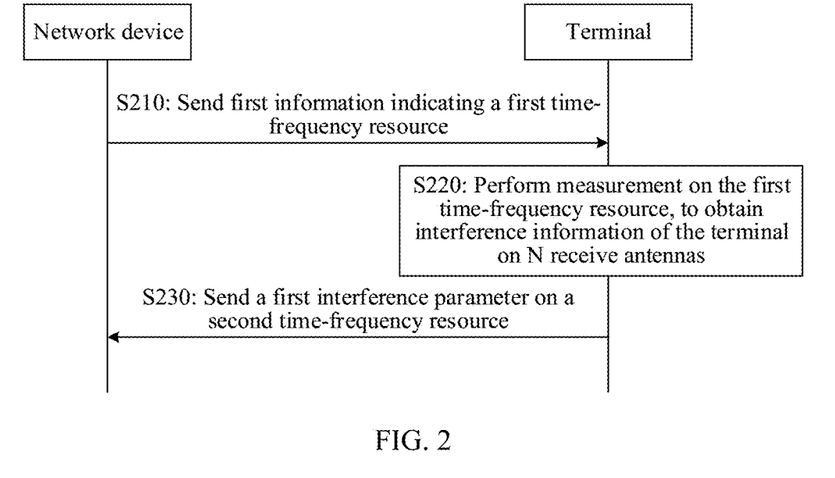
FIG. 2 is a schematic flowchart of an interference reporting method according to an embodiment of this application.

Improvement of data transmission efficiency by the link adaptation technology mainly depends on accuracy of the CSI. The CSI includes channel information and interference information. The channel information herein refers to a characteristic of signal propagation on a radio channel. Currently, a method for obtaining CSI in 5G new radio (NR) focuses on obtaining channel information, including obtaining non-quantized channel information based on sounding reference signal (SRS) measurement and obtaining quantized channel information based on precoding matrix indicator (PMI) feedback. However, little attention is paid to interference information obtaining solutions. Currently, there is only one solution for obtaining implicit interference information based on channel quality indicator (CQI) feedback. When the terminal uses multi-antenna reception, the interference information is a vector or a matrix, and the CQI is a scalar. Based on the CQI, the network device cannot accurately and completely restore the interference information representing the downlink interference measured by the terminal. In a time division duplex (TDD) system, a network device may obtain uplink channel information by measuring an SRS sent by a terminal, and obtain downlink channel information based on channel reciprocity. In a frequency division duplex (FDD) system or a TDD system, a network device may obtain a rank indicator (R1), a PMI, and a CQI based on CSI fed back by a terminal, to obtain quantized values of some eigenvectors of a downlink channel; or may implicitly learn, based on the CQI, of impact of interference on downlink signal reception, but cannot restore an autocorrelation matrix R of a downlink interference signal. This implicit and rough interference information feedback method may reduce the effectiveness of the link adaptation technology. As shown in FIG. 2, an embodiment of this application provides an interference reporting method. The following describes the method in detail. The method may be performed by a network device and a terminal, or may be performed by modules (for example, chips) in the network device and the terminal. The following descriptions are provided by using an example in which the network device and the terminal perform the method.

S210: The network device sends first information to the terminal, where the first information indicates a first time-frequency resource. Correspondingly, the terminal receives the first information from the network device. Further, the terminal may determine the first time-frequency resource based on the first information.

Optionally, the first information is carried in signaling sent by the network device to the terminal. In some embodiments, the signaling may be higher layer signaling or physical layer signaling. The higher layer signaling may be radio resource control (RRC) signaling or medium access control (MAC) layer signaling, and the physical layer signaling may be downlink control information (DCI) carried on a PDCCH.

The first time-frequency resource may be a time-frequency resource for sending a channel state information reference signal (CSI-RS). The CSI-RS may be a non-zero-power (NZP) CSI-RS or a zero-power (ZP) CSI-RS. Alternatively, the first time-frequency resource may be a time-frequency resource for sending downlink data, for example, may be a time-frequency resource for sending a PDSCH.

S220: The terminal performs measurement on the first time-frequency resource, to obtain interference information of the terminal on N receive antennas, where N is an integer greater than 1.

Optionally, the interference information is an autocorrelation matrix R of interference signals received by the terminal on the N receive antennas. Singular value decomposition of the matrix R is $R = U\Sigma U^H$, where the matrix $U = [u_1, u_2, \ldots, u_N]$, $\Sigma = \text{Diag}(\lambda_1, \lambda_2, \ldots, \lambda_N)$, $U^H$ represents a conjugate transposed matrix of the matrix U, and $\text{Diag}(\lambda_1, \lambda_2, \ldots, \lambda_N)$ represents a diagonal matrix whose main diagonal elements are $\lambda_1, \lambda_2, \ldots, \lambda_N$. $\lambda_1, \lambda_2, \ldots, \lambda_N$ constitute a first value set $\{\lambda_1, \lambda_2, \ldots, \lambda_N\}$, where i is a positive integer less than or equal to N. $u_1, u_2, \ldots, u_N$ constitute a first vector set $\{u_1, u_2, \ldots, u_N\}$. Without loss of generality, it may be assumed that $\lambda_1 \geq \lambda_2 \geq \ldots \geq \lambda_N$. It can be learned from a definition of the autocorrelation matrix R that the first value set is in a one-to-one correspondence with the element in the first vector set. In other words, for any positive integer i less than or equal to N, $\lambda_i$ corresponds to one $u_i$. In some embodiments of this application, subscripts of elements in a set may start from 1 or may start from 0. In this embodiment of this application, an example in which the subscripts start counting from 1 is used for description.

When the first time-frequency resource is for sending a first NZP CSI-RS, and the network device indicates that the first NZP CSI-RS is for measuring a target radio channel, the terminal first determines an estimated value of the target radio channel based on a signal received on the first time-frequency resource and a sending sequence of the first NZP CSI-RS, and then determines an interference signal received on the first time-frequency resource based on the estimated value of the target radio channel, the sending sequence of the first NZP CSI-RS, and the signal received on the first time-frequency resource. Specifically, the terminal may estimate, based on the estimated value of the target radio channel and the sending sequence of the first NZP CSI-RS, an estimated signal value of the first NZP CSI-RS that arrives at the terminal side, and then subtract the estimated signal value of the first NZP CSI-RS that arrives at the terminal side from the signal received on the first time-frequency resource, to obtain the interference on the signal received on the first time-frequency resource. The target radio channel herein is a radio channel between the network device and the terminal. The network device establishes a radio air interface connection with the terminal. The network device and the terminal receive and send information through the radio channel.

When the first time-frequency resource is for sending a ZP CSI-RS, the terminal may directly determine the interference on the signal based on the signal received on the first time-frequency resource.

When the first time-frequency resource is for sending a second NZP CSI-RS, and the network device indicates that the second NZP CSI-RS is for interference measurement, the terminal first determines an estimated value of an interference channel based on a signal received on the first time-frequency resource and a sending sequence of the second NZP CSI-RS. The interference channel herein may be a radio channel between a second network device and the terminal. A signal sent by the second network device causes interference to receiving, by the terminal, a downlink signal of the network device. Optionally, the network device further indicates that the second NZP CSI-RS is for measuring inter-cell interference.

When the first time-frequency resource is a time-frequency resource of a first PDSCH, the terminal determines a demodulation reference signal (DMRS) of the first PDSCH, which is denoted as a first DMRS, determines an estimated value of a target radio channel based on a signal received on a time-frequency resource of the first DMRS and a sending sequence of the first DMRS, and then determines, based on the estimated value of the target radio channel, the sending sequence of the first DMRS, and the signal received on the time-frequency resource of the first DMRS, an interference on the signal received on the time-frequency resource of the first DMRS. Alternatively, the terminal determines, based on the first DMRS of the first PDSCH and received data information, the interference signal received on the first time-frequency resource. For example, the terminal demodulates and decodes data received on the first time-frequency resource. After the data is successfully decoded, the terminal may obtain original data sent by the network device. The terminal may obtain the estimated value of the target radio channel through measurement based on the first DMRS, and restore, based on the estimated value of the target radio channel and the original data sent by the network device, an estimated value of the original data received by the terminal. Then, the terminal may subtract the estimated value of the original data from the data received on the first time-frequency resource, to obtain the interference on the signal received on the first time-frequency resource (hereafter referred as "received interference signal" or "interference signal").

Further, the terminal may calculate an autocorrelation matrix R of the interference signal based on the received interference signal, where the autocorrelation matrix R represents an expected value of an autocorrelation matrix of the interference signal. The autocorrelation matrix is an N*N complex matrix, where N represents a quantity of receive antennas of the terminal.

S230: The terminal sends a first interference parameter to the network device on a second time-frequency resource, where the first interference parameter is determined based on the interference information. Correspondingly, the network device receives the first interference parameter from the terminal device on the second time-frequency resource. The network device may determine interference information of the terminal on the N receive antennas based on the first interference parameter.

Specifically, the terminal may send the first interference parameter to the network device through a PUCCH or a PUSCH. In other words, the second time-frequency resource may be a time-frequency resource of the PUCCH or the PUSCH. The first interference parameter is carried on the PUCCH or the PUSCH.

When the second time-frequency resource is a time-frequency resource of the PUCCH, the terminal may encode and modulate the first interference parameter based on a modulation and coding scheme indicated by the network device or predefined in a protocol, and then map the encoded and modulated first interference parameter to the second time-frequency resource, and send the second time-frequency resource to the network device. Optionally, when the first time-frequency resource is a time-frequency resource of the first PDSCH, a time domain position of the PUCCH may be determined based on the first information and the time domain position of the first PDSCH.

Optionally, the network device may send second information to the terminal, where the second information indicates the second time-frequency resource.

As described in S202, the terminal may obtain $R=U\Sigma U^H$ by performing singular value decomposition on the autocorrelation matrix R, where a matrix $U=[u_1, u_2, \ldots, u_N]$, and $\Sigma=\text{Diag}(\lambda_1, \lambda_2, \ldots, \lambda_N)$, to obtain the first value set $\{\lambda_1, \lambda_2, \ldots, \lambda_N\}$ and the first vector set $\{u_1, u_2, \ldots, u_N\}$. Further, the terminal may determine the first interference parameter based on the first value set and the first vector set. The following are two solutions for reporting the first interference parameter provided as examples.

Solution 1

The first interference parameter includes at least one of an interference layer indicator (ILI), an interference matrix indicator (IMI), and an interference strength indicator (ISI). The ILI indicates a value L, and L is a nonnegative integer less than or equal to N. The IMI is determined based on the first vector set. The ISI is determined based on the first value set. The first value set and the first vector set are determined based on the interference information.

Specifically, L is equal to a quantity of elements $\lambda_i$ that are in the first value set and whose values are greater than or equal to a first threshold, and i is a positive integer less than or equal to N. The first threshold may be predefined in a protocol, or may be configured by the network device for the terminal by using signaling. The ILI may be equal to L, or may be equal to a value obtained by performing specific encoding and mapping on L. Possibly, L determined by the terminal is always equal to N, and the first interference parameter may not include the ILI. In other words, the terminal does not need to report the ILI to the network device. In this case, by default the network device considers that a value of the ILI is N.

When L is a positive integer, the ISI includes L interference strength values. The L interference strength values are determined based on a second value set $\{\varphi_1, \varphi_2, \ldots, \varphi_L\}$. The second value set includes L values, and a value of an element $\varphi_j$ in the second value set is equal to a ratio of a value of an element $\lambda_j$ in the first value set to a first reference value, and j is a positive integer less than or equal to L. It may be understood that, when the elements in the first value set meet the condition that $\lambda_1 \geq \lambda_2 \geq \ldots \geq \lambda_N$, and the first reference value is a positive number, the elements in the second value set meets the condition that $\varphi_1 \geq \varphi_2 \geq \ldots \geq \varphi_L$. The value of the element $\lambda_j$ in the first value set is divided by the first reference value to obtain the value of the element $\varphi_j$ in the second value set. This process may be referred to as normalization of the value of the elements in the first value set.

The first reference value may be predefined in a protocol, or may be configured by the network device for the terminal by using signaling. Specifically, the terminal may determine the first reference value by using the following four methods.

Method RV1: The first reference value may be noise power received by the terminal on the first time-frequency resource, and the noise power is determined based on at least one of receive bandwidth, a thermal noise power spectral density, or a noise factor of the terminal. For example, the first reference value=the thermal noise power spectral density*the noise factor*the receive bandwidth*an expansion factor alpha, where the expansion factor is optional. Optionally, the receive bandwidth may be a granularity of interference measurement. For example, if interference measurement is performed by using four resource blocks (RBs) as the granularity, the receive bandwidth herein is four RBs.

Method RV2: The first reference value may alternatively be a reference signal received power (RSRP) obtained by the terminal through measurement. The reference signal in some embodiments of this application may be a synchronization signal sent by the network device to the terminal, a reference signal in a broadcast channel, a CSI-RS, or a DMRS. The first reference value is an average value of received reference signal powers.

Method RV3: The first reference value may alternatively be configured by the network device for the terminal by using signaling. Specifically, the network device may directly indicate a value of the first reference value, or may indicate an interference-to-noise ratio (INR). The terminal determines a reference interference signal power based on the INR and a noise power (for example, the noise power determined in the method RV1), and the reference interference signal power is the first reference value. Specifically, the reference interference signal power is equal to a product of the INR and the noise power.

Method RV4: The first reference value is determined based on a first channel quality indicator (CQI) index and a first mapping relationship, where the first CQI index is a CQI value in a CSI report associated with the first interference parameter. The first mapping relationship includes one or more first sub-mapping relationships, and each first sub-mapping relationship includes a mapping relationship from one CQI index to one first reference value.

Further, the terminal may determine L interference strength values based on the second value set $\{\varphi_1, \varphi_2, \ldots, \varphi_L\}$ by using the following methods.

Method ISV1: The L interference strength values are quantized values of L elements in the second value set. Specifically, a $j^{th}$ interference strength value in the L interference strength values is determined based on a value of an element $\varphi_j$ in the second value set and a second mapping relationship. The second mapping relationship includes one or more second sub-mapping relationships. Each second sub-mapping relationship includes a mapping relationship from a value range of nonnegative real numbers to a nonnegative integer. As shown in Table 1, the second mapping relationship includes 16 second sub-mapping relationships. $a_0, a_1, \ldots, a_{15}, a_{16}$ in Table 1 are nonnegative real numbers, and the interference strength value is represented by four bits.

TABLE 1

Example of the second mapping relationship

| $\varphi_j$ | Interference strength value |
|---|---|
| $[a_0, a_1)$ | 0000 |
| $[a_1, a_2)$ | 0001 |
| $[a_2, a_3)$ | 0010 |
| ... | ... |
| $[a_{15}, a_{16})$ | 1111 |

Method ISV2: The L interference strength values are quantized values of difference values or ratios of two adjacent elements in the L elements in the second value set. Specifically, the first interference strength value in the L interference strength values is determined based on $\varphi_1$ in the second value set and the second mapping relationship. An $r^{th}$ interference strength value is determined based on a difference value $\varphi_{r-1} - \varphi_r$ of $\varphi_{r-1}$ and $\varphi_r$ in the second value set and a third mapping relationship; or an $r^{th}$ interference strength value is determined based on a ratio $\varphi_{r-1}/\varphi_r$ (or $\varphi_r/\varphi_{r-1}$) of elements $\varphi_{r-1}$ and $\varphi_r$ in the second value set and a third mapping relationship, where r is an integer greater than or equal to 2 and less than or equal to L. The third mapping relationship includes one or more third sub-mapping relationships. Each third sub-mapping relationship may include a mapping relationship from a range of nonnegative real numbers to a nonnegative integer. The third mapping relationship may be the same as or different from the second mapping relationship. As shown in Table 2, the third mapping relationship includes four third sub-mapping relationships. $b_0, b_1, b_2, b_3, b_4$ in Table 2 are nonnegative real numbers, and the interference strength value is represented by using two bits. When the $r^{th}$ interference strength value is determined based on $\varphi_{r-1} - \varphi_r$ and the third mapping relationship, $b_0$ in Table 2 is equal to 0. When the $r^{th}$ interference strength value is determined based on $\varphi_{r-1}/\varphi_r$ and the third mapping relationship, $b_0$ in Table 2 is equal to 1. When the $r^{th}$ interference strength value is determined based on $\varphi_r/\varphi_{r-1}$ and the third mapping relationship, $b_4$ in Table 2 is equal to 1.

TABLE 2

Example of the third mapping relationship

| $\varphi_{r-1} - \varphi_r$, $\varphi_{r-1}/\varphi_r$, or $\varphi_r/\varphi_{r-1}$ | Interference strength value |
|---|---|
| $[b_0, b_1)$ | 00 |
| $[b_1, b_2)$ | 01 |
| $[b_2, b_3)$ | 10 |
| $[b_3, b_4)$ | 11 |

Method ISV3: The L interference strength values are quantized values of L elements in the second value set after the L elements in the second value set are transformed. Specifically, the second value set is transformed to obtain a third value set $\{\phi_1, \phi_2, \ldots, \phi_L\}$. For example, $\phi_j=10\times \log_{10}\varphi_j$. A $j^{th}$ interference strength value in the L interference strength values is determined based on a value of an element $\phi_j$ in the third value set and a fourth mapping relationship. The fourth mapping relationship includes one or more fourth sub-mapping relationships. Each fourth sub-mapping relationship includes a mapping relationship from a range of real numbers to a nonnegative integer.

Method ISV4: The L interference strength values are quantized values of difference values or ratios of two adjacent elements in the L elements in the second value set after the L elements in the second value set are transformed. Specifically, the second value set is transformed to obtain a third value set $\{\phi_1, \phi_2, \ldots, \phi_L\}$. For example, $\phi_j=10\times \log_{10}\varphi_j$. The first interference strength value in the L interference strength values is determined based on an element $\phi_1$ in the third value set and the fourth mapping relationship. An $r^{th}$ interference strength value in the L interference strength values is determined based on a difference value $\phi_{r-1}-\phi_r$ of elements $\phi_{r-1}$ and $\phi_r$ in the third value set and a fifth mapping relationship, or an $r^{th}$ interference strength value is determined based on a ratio $\phi_{r-1}/\phi_r$ (or $\phi_r/\phi_{r-1}$) of elements $\phi_{r-1}$ and $\phi_r$ in the third value set and a sixth mapping relationship, where r is an integer greater than or equal to 2 and less than or equal to L. The fifth mapping relationship includes one or more fifth sub-mapping relationships. Each fifth sub-mapping relationship includes a mapping relationship from a range of nonnegative real numbers to a nonnegative integer. The sixth mapping relationship includes one or more sixth sub-mapping relationships. Each sixth sub-mapping relationship includes a mapping relationship from a range of real numbers to a nonnegative integer.

Optionally, when L is a positive integer, the ISI may include L+1 interference strength values. The first interference strength value is determined based on $\varphi_0$ and the second mapping relationship, and $\varphi_0$ is determined based on the second value set, for example, is an average value of L $\varphi_j$ in the second value set. A $(j+1)^{th}$ interference strength value is determined based on a difference value $\varphi_j-\varphi_0$ (or $\varphi_0-\varphi_j$) of a value of a $j^{th}$ element $\varphi_j$ and $\varphi_0$ in the second value set and the sixth mapping relationship; or a $(j+1)^{th}$ interference strength value is determined based on a ratio $\varphi_j/\varphi_0$ (or $\varphi_0/\varphi_j$) of a $j^{th}$ element $\varphi_j$ and $\varphi_0$ in the second value set and the third mapping relationship.

Correspondingly, the network device may obtain the L interference strength values based on the received first interference parameter. Further, the network device determines the second value set based on the L interference strength values. A specific determining process may be considered as an inverse process of the process in which the terminal determines the L interference strength values based on the second value set. Finally, the network device may determine the first value set based on the second value set and the first reference value. For example, a value of an element $\lambda_j$ in the first value set is equal to a product of a value of an element $\varphi_j$ in the second value set and the first reference value.

A process of determining the L or L+1 interference strength values may be summarized as follows: First, elements in the first value set are normalized to obtain a second value set, then elements in the second value set are quantized to obtain an interference strength value; or a difference value or a ratio of two adjacent elements in the second value set is quantized to obtain an interference strength value; or elements in the second value set are transformed to obtain a third value set, and elements in the third value set are quantized to obtain an interference strength value; or a difference value or a ratio of two adjacent elements in the third value set are quantized to obtain an interference strength value. It may be understood that the foregoing normalization process may also be performed after the difference value and the ratio are of the elements in the value set are obtained. For example, a difference value or a ratio of two adjacent elements in the first value set may be normalized, and then the normalized value is quantized to obtain the interference intensity value; or the first value set may be transformed to obtain a fourth value set, for which refer to a method of transforming the second value set to obtain the third value set, and then elements in the fourth value set are quantized to obtain the interference intensity value; or elements in the fourth value set may be normalized, and then the normalized value is quantized to obtain the interference strength value; or a difference value or a ratio of two adjacent elements in the fourth value set may be quantized to obtain the interference strength value; or a difference value or a ratio of two adjacent elements in the fourth value set may be normalized, and then the normalized value is quantized to obtain the interference strength value.

The IMI is determined based on a first interference matrix $U_I$ and a first codebook, where the first interference matrix $U_I=[u_1, u_2, \ldots, u_L]$. The first codebook may be predefined in a protocol, or may be configured by the network device for the terminal by using signaling. The first codebook includes N sub-codebooks, an $i^{th}$ sub-codebook in the N sub-codebooks includes at least one matrix, and each matrix in the $i^{th}$ sub-codebook is a matrix of N×i dimensions.

Specifically, the IMI may indicate a second matrix in an $L^{th}$ sub-codebook in the first codebook. For example, the IMI may be an index that is in the $L^{th}$ sub-codebook and that is of a second matrix in the $L^{th}$ sub-codebook in the first codebook, and the second matrix is a matrix that is in the $L^{th}$ sub-codebook and that has a smallest difference from the first interference matrix. A difference between a matrix A1 and a matrix A2 may be represented as $\|A1-A2\|$, where $\|A\|$ represents a norm of a matrix A, for example, a 1 norm or an F norm (Frobenius norm).

Correspondingly, the network device may determine, based on the IMI, that the interference matrix is the second matrix indicated by the IMI in the $L^{th}$ sub-codebook.

Optionally, the first interference parameter includes the ILI, and the first interference parameter further includes the IMI and/or the ISI. The terminal performs coding and modulation on a second interference parameter, and sends the coded and modulated second interference parameter to the network device on a third time-frequency resource, where the second interference parameter includes the ILI, and a bit length of the second interference parameter is predefined in a protocol or is configured by the network device for the terminal by using RRC signaling. The terminal performs coding and modulation on a third interference parameter, and sends the coded and modulated third interference parameter to the network device on a fourth time-frequency resource, where the third interference parameter is a parameter other than the second interference parameter in the first interference parameter. The third time-frequency resource and the fourth time-frequency resource are some time-frequency resources in the second time-frequency resource, and the third time-frequency resource is different from the fourth time-frequency resource. The second interference parameter may further include first bit length information, and the first bit length information indicates a quantity of information bits of the third interference parameter. Correspondingly, the network device first receives the second interference parameter on the third time-frequency resource, and then determines the quantity of information bits of the third interference parameter based on the ILI or the first bit length information in the second interference parameter. The network device further receives the third interference parameter on the fourth time-frequency resource based on the quantity of information bits of the third interference parameter, and demodulates and decodes the third interference parameter.

When the second time-frequency resource is a time-frequency resource of a PUSCH, the terminal may carry the first interference parameter in a MAC control element (CE) and send the MAC control element to the network device through the PUSCH. Specifically, the terminal may first generate a first MAC CE, where the first MAC CE includes the first interference parameter, then generate a first MAC protocol data unit (PDU), where the first MAC PDU includes the first MAC CE, and finally perform coding and modulation on the first MAC PDU based on a code rate and a modulation scheme that are indicated by the network device, and send the coded and modulated first interference parameter to the network device on the second time-frequency resource. Correspondingly, the network device receives the PUSCH, namely, the first MAC PDU, on the second time-frequency resource, then restores the first MAC CE from the first MAC PDU, and determines the first interference parameter. Specifically, the first MAC CE may include the second interference parameter and the third interference parameter.

In the foregoing method in which the first interference parameter is divided into the second interference parameter and the third interference parameter for reporting, reporting may be performed based on an actual length of the information bits of the first interference parameter, and the reporting format does not need to be fixed length, so that the overheads of reporting the first interference parameter can be reduced.

Optionally, the first interference parameter includes the ISI or includes the ILI and the ISI, and the terminal sends the first interference parameter to the network device on the second time-frequency resource. For the IMI, the terminal may implicitly feed back the IMI by sending a first reference signal and a second reference signal to the network device, where a precoding matrix of the first reference signal is $W_1$, a precoding matrix of the second reference signal $W_2=W_1U_I$, and a first interference matrix $U_I=[u_1, u_2, \ldots, u_L]$. Both the first reference signal and the second reference signal herein may be sounding reference signals (SRSs). Specifically, $W_1$ may be a unit matrix, and the corresponding $W_2$ is the first interference matrix. In this manner of implicitly feeding back the IMI, the overheads of feeding back the interference information can be effectively reduced.

Correspondingly, the network device receives the first interference parameter on the second time-frequency resource, obtains the ISI or obtains the ILI and the ISI, then separately receives the first reference signal and the second reference signal, and obtains the first interference matrix through calculation by using a signal received on a time-frequency resource of the first reference signal and a signal received on a time-frequency resource of the second reference signal. This is equivalent to obtaining the IMI. It is assumed that the signal received on the time-frequency resource of the first reference signal is $Y_1=HW_1S_1+I_1+Z_1$, and the signal received on the time-frequency resource of the second reference signal is $Y_2=HW_1U_IS_2+I_2+Z_2$, where $S_1$ is a pilot sequence of the first reference signal, $S_2$ is a pilot sequence of the second reference signal, H is an uplink radio channel, $I_1$ and $Z_1$ are respectively interference and noise received when the network device receives the first reference signal, and $I_2$ and $Z_2$ are respectively interference and noise received when the network device receives the second reference signal. The network device may directly obtain $U_I$ through estimation based on $Y_1$ and $Y_2$, or the network device may first separately estimate the radio channel based on $Y_1$ and $Y_2$, to obtain estimated values of $H_1=HW_1$ and $H_2=HW_1U_I$, and then obtain $U_I$ through estimation based on the estimated values of $H_1$ and $H_2$.

Solution 2

Optionally, the interference information is an autocorrelation matrix R of interference signals received by the terminal on the N receive antennas, and the first interference parameter includes all elements in a triangular matrix (which may be a lower triangular matrix or an upper triangular matrix) of a matrix R2, where the matrix R2 is a quantization matrix of a matrix R1, and the matrix R1 is determined based on the autocorrelation matrix R of the interference signal and a second reference value. The lower triangular matrix is used as an example. The first interference parameter includes Q elements, $Q=N*(N+1)/2$, and a $q^{th}$ element corresponds to an $(s, t)^{th}$ element in the matrix R2, where s and t are positive integers, $q=1+2+ \ldots + (s-1)+t$, $1 \le s \le N$, $1 \le t \le s$.

Specifically, an $(s, t)^{th}$ element $r_{s,t}$ in the matrix R1 is a ratio of an $(s, t)^{th}$ element $r_{s,t}$ in the matrix R to the second reference value. A method for determining the second reference value may be one of the foregoing methods for determining the first reference value.

Optionally, the $(s, t)^{th}$ element $r2_{s,t}$ in the matrix R2 is determined based on the $(s, t)^{th}$ element $r1_{s,t}$ in the matrix R1 and a seventh mapping relationship. The seventh mapping relationship includes one or more seventh sub-mapping relationships, and each seventh sub-mapping relationship includes a mapping relationship from a range of complex numbers to a nonnegative integer.

Optionally, a real part of the $(s, t)^{th}$ element $r2_{s,t}$ in the matrix R2 is determined based on a real part of the $(s, t)^{th}$ element $r1_{s,t}$ in the matrix R1 and an eighth mapping relationship; and an imaginary part of the $(s, t)^{th}$ element $r2_{s,t}$ in the matrix R2 is determined based on an imaginary part of the $(s, t)^{th}$ element $r1_{s,t}$ in the matrix R1 and the eighth mapping relationship. The eighth mapping relationship includes one or more eighth sub-mapping relationships, and each eighth sub-mapping relationship includes a mapping relationship from a range of real numbers to a nonnegative integer.

Optionally, an $(s, s)^{th}$ element $r2_{s,s}$ in the matrix R2 is determined based on an $(s, s)^{th}$ element $r1_{s,s}$ in the matrix R1 and the eighth mapping relationship, and the $(s, t)^{th}$ element $r2_{s,t}$ in the matrix R2 is determined based on the $(s, t)^{th}$ element $r1_{s,t}$ in the matrix R1 and the seventh mapping relationship, or the $(s, t)^{th}$ element $r2_{s,t}$ in the matrix R2 is determined based on the $(s, t)^{th}$ element $r_{s,t}$ in the matrix R1, the $(s, s)^{th}$ element $r1_{s,s}$ in the matrix R1, and an $(t, t)^{th}$ element $r1_{t,t}$ in the matrix R1, where s is not equal to t. Specifically, a non-diagonal element $r2_{s,t}$ in the matrix R2 is determined based on $a_{s,t}$ and the seventh mapping relationship; or the real part of the $(s, t)^{th}$ element $r2_{s,t}$ in the matrix R2 is determined based on a real part of $a_{s,t}$ and the eighth mapping relationship, and the imaginary part of the $(s, t)^{th}$ element $r2_{s,t}$ in the matrix R2 is determined based on an imaginary part of $a_{s,t}$ and the eighth mapping relationship.

$$a_{s,t} = \frac{r1_{s,t}}{\sqrt{r1_{s,s} \times r1_{t,t}}}.$$

Optionally, the (s, s)$^{th}$ element $r2_{s,s}$ in the matrix R2 is determined based on the (s, s)$^{th}$ element $r1_{s,s}$ in the matrix R1, an average value $R1_{mean,diag}$ of N diagonal elements in the matrix R1, and a ninth mapping relationship. Specifically, $r2_{s,s}$ is determined based on $r1_{s,s}-R1_{mean,diag}$ or $R1_{mean,diag}-r1_{s,s}$ and the ninth mapping relationship. Correspondingly, the first interference parameter may further include information about the average value $R1_{mean,diag}$ of N diagonal elements in the matrix R1. The ninth mapping relationship includes one or more ninth sub-mapping relationships, and each ninth sub-mapping relationship includes a mapping relationship from a range of real numbers to a nonnegative integer.

When sending the first interference parameter to the network device, the terminal may use a plurality of bits to represent one element in the matrix R2. For example, a diagonal element is a real number and is represented by using S1 bits, and a non-diagonal element is a complex number and is represented by using S2 bits, where $S2_r$ bits represent a real part, $S2_i$ bits represent an imaginary part, and $S2_r+S2_i=S2$.

In this interference reporting method, the network device may recover, based on the first interference parameter fed back by the terminal, interference to the terminal (for example, recover the autocorrelation matrix of the interference signal), so that the network device can perform more accurate downlink data scheduling, including precoding optimization, coding and modulation scheme selection, terminal pairing in a multi-user multiple-input multiple-output (MU-MIMO) scenario, and the like.

Figure 3:
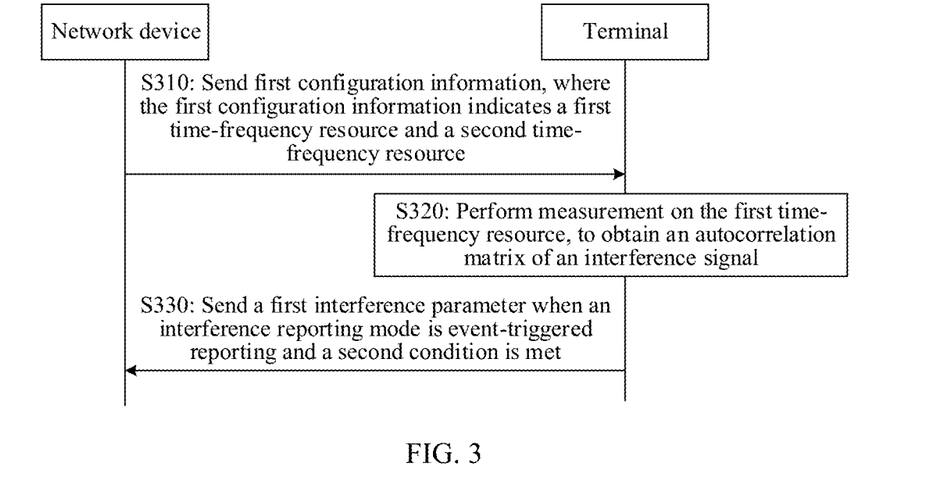
FIG. 3 is a schematic flowchart of an event-triggered interference reporting method according to an embodiment of this application.

As shown in FIG. 3, an embodiment of this application further provides an event-triggered interference reporting method.

S310: A network device sends first configuration information to a terminal, where the first configuration information indicates a first time-frequency resource and a second time-frequency resource. The first time-frequency resource is a time-frequency resource for interference measurement, and the second time-frequency resource is a time-frequency resource for interference reporting. The first configuration information may be carried in higher layer signaling or physical layer signaling. Correspondingly, the terminal receives the first configuration information from the network device.

Specifically, for the first time-frequency resource, refer to the related descriptions of the first time-frequency resource in the embodiment in FIG. 2, and for the second time-frequency resource, refer to the related descriptions of the second time-frequency resource in the embodiment in FIG. 2.

The first configuration information may further indicate an interference reporting mode. The interference reporting mode includes at least one of periodic reporting, semi-persistent reporting, or aperiodic reporting. The aperiodic reporting includes at least one of DCI-triggered aperiodic reporting or event-triggered aperiodic reporting.

The network device may configure a plurality of pieces of configuration information for interference reporting for the terminal, where the configuration information of each interference report corresponds to at least one time-frequency resource for interference measurement, at least one time-frequency resource for interference reporting, or one interference reporting mode. Correspondingly, the first configuration information may further indicate indexes or numbers of the plurality of pieces of configuration information for interference reporting, and indicate to the terminal to perform interference measurement and interference reporting based on parameters corresponding to the configuration information for interference reporting.

When the interference reporting mode is periodic reporting or semi-persistent reporting, the time-frequency resource for interference measurement and the time-frequency resource for interference reporting are periodic or semi-persistent. When the interference reporting mode is aperiodic reporting, the time-frequency resource for interference measurement and the time-frequency resource for interference reporting may be aperiodic. Specifically, the time-frequency resource for interference measurement and the time-frequency resource for interference reporting may be indicated by using DCI.

Optionally, when the first configuration information includes a first parameter, or a value of a first parameter is a first preset value, the interference reporting mode is event-triggered aperiodic reporting.

Optionally, when the first configuration information includes the second parameter or a value of the second parameter is a second preset value, the time-frequency resource for interference measurement includes a PDSCH resource, or the time-frequency resource for interference measurement is a PDSCH resource.

Optionally, when the first configuration information includes the third parameter or a value of the third parameter is a third preset value, the time-frequency resource for interference reporting includes a PUSCH resource, or the time-frequency resource for interference reporting is a PUSCH resource. When the time-frequency resource for interference reporting includes the PUSCH resource, the PUSCH resource is a first PUSCH resource that meets a first condition. For example, the first condition is that a distance between the PUSCH resource and the time-frequency resource for interference measurement is greater than or equal to a first time length. Specifically, the first time length is predefined in a protocol, or is indicated by the network device to the terminal by using signaling. For example, the first time length is the minimum processing time for interference measurement defined in a protocol. For another example, when the interference reporting mode is aperiodic reporting and is triggered by a first DCI, the first condition may further include that a distance between the PUSCH resource and the first DCI is greater than or equal to a second time length, where the second time length is predefined in a protocol or indicated by the network device to the terminal using signaling. Optionally, the PUSCH resource includes a PUSCH resource dynamically scheduled by using DCI and/or a configured grant PUSCH resource.

Optionally, the first configuration information further includes frequency domain indication information for interference measurement. The frequency domain indication information includes a first subband set, the first subband set includes M subbands, the M subbands may be consecutive or may be inconsecutive, and M is an integer greater than or equal to 1. The terminal measures interference on the first subband set, and reports interference information on the first subband set to the network device. Further, the first configuration information may further include a frequency domain reporting mode for interference reporting. The frequency domain reporting mode includes mode 1 and mode 2. For mode 1, only one piece of interference information is reported on all subbands. To be specific, the terminal obtains one first interference parameter through calculation based on interference information on all subbands. For mode 2, M pieces of interference information are reported on the M subbands. To be specific, the terminal separately obtains a first interference parameter through calculation based on interference information on each subband, and then reports M first interference parameters to the network device. For mode 2, the terminal may feed back the IMI in a differential feedback manner by using frequency domain resources. For example, the terminal may report one i1 and M i2s to the network device, and the IMI on the subband is determined based on i1 and i2 corresponding to the subband. The terminal may report one ILI to the network device, to indicate a quantity of interference flows on a subband. Alternatively, the terminal may not report an ILI to the network device, but by default considers that a quantity of interference flows is N.

Optionally, when the first time-frequency resource includes the PDSCH resource, for one subband, the terminal measures the interference information based on PDSCH transmission on the subband before the first symbol. The first symbol is determined based on the second time-frequency resource and a third time length, or the first symbol is the last symbol whose distance from the second time-frequency resource is greater than or equal to the third time length. It may also be understood that the first symbol is the last interference measurement symbol that meets a requirement of sending the interference report on the second time-frequency resource. The third time length is predefined in a protocol, or is indicated by the network device to the terminal by using signaling.

Optionally, when the first time-frequency resource includes the PDSCH resource, for one subband, the terminal measures the interference information based on PDSCH transmission on the subband before the first symbol and after a second symbol. The second symbol is determined based on the second time-frequency resource and a fourth time length, or the second symbol is the earliest symbol whose distance from the second time-frequency resource is less than or equal to the fourth time length. It may also be understood that the second symbol is the earliest interference measurement symbol that meets a requirement of sending the interference report on the second time-frequency resource. The fourth time length is predefined in a protocol, or is indicated by the network device to the terminal by using signaling.

The first configuration information may further indicate content of the first interference parameter and an interference reporting solution. For example, the first configuration information indicates that the first interference parameter includes an ILI, an IMI, and an ISI; or the first configuration information indicates that the first interference parameter includes an IMI and an ISI; or the first configuration information indicates that the first interference parameter includes an ISI or an ILI and an ISI, and implicitly feeds back an IMI by sending the first reference signal and the second reference signal; or the first configuration information indicates to the terminal to feed back an element in an upper triangular matrix or a lower triangular matrix of the matrix R2 according to the solution 2 in the embodiment in FIG. 2.

Optionally, alternatively, the first configuration information may be the first information in S210.

S320: The terminal performs measurement on the first time-frequency resource, to obtain an autocorrelation matrix of interference signals received by the terminal on N receive antennas, where N is an integer greater than 1. For a related process, refer to related descriptions of S220 in FIG. 2.

S330: When the interference reporting mode is event-triggered aperiodic reporting, and a second condition is met, the terminal sends a first interference parameter to the network device on the second time-frequency resource, where the first interference parameter is determined based on the autocorrelation matrix of the interference signal. Correspondingly, the network device receives the first interference parameter from the terminal device on the second time-frequency resource.

Optionally, the second condition is that a fourth value is greater than or equal to a second threshold, where the fourth value is determined based on an autocorrelation matrix Rm of an interference signal obtained through measurement and an autocorrelation matrix Rr of an interference signal corresponding to a first interference parameter that is recently reported. Specifically, the fourth value may represent a degree of change from Rr to Rm. For example, the fourth value is equal to a norm of Rm–Rr, or the fourth value is equal to a ratio of a norm of Rm–Rr to a norm of Rr.

Optionally, the second condition is that decoding of a first PDSCH transmitted on the first time-frequency resource fails. The autocorrelation matrix of the interference signal is obtained through measurement on the first PDSCH.

Optionally, the second condition is that decoding of a second PDSCH transmitted on a seventh time-frequency resource fails, there is a correspondence between the seventh time-frequency resource and the second time-frequency resource, the seventh time-frequency resource is different from the first time-frequency resource, and the correspondence is predefined or preconfigured. For example, the seventh time-frequency resource is a resource on which any second PDSCH is transmitted, the second time-frequency resource is a second time-frequency resource in the earliest time unit after a third symbol, and the third symbol is the 1$^{st}$ symbol that is at the fifth time length after an end symbol of the seventh time-frequency resource. In this case, the first configuration information is only for configuring a position of the second time-frequency resource in a time unit, and a specific time unit of the second time-frequency resource is implicitly determined by using the seventh time-frequency resource.

Optionally, the second condition is that a signal to interference plus noise ratio (SINR) of the third information is greater than or equal to a third threshold; or the second condition is that a receiving success rate of the third information is greater than a fourth threshold. Specifically, the third information may be a second PDSCH received on a fifth time-frequency resource, or the third information is a reference signal received on a fifth time-frequency resource. The receiving success rate is an information receiving success rate estimated based on an estimated SINR or soft information (for example, a likelihood value). The fifth time-frequency resource herein may alternatively be the foregoing first time-frequency resource for interference measurement, and the second PDSCH may alternatively be the foregoing first PDSCH.

The second threshold, the third threshold, and the fourth threshold may be predefined in a protocol, or may be configured by the network device for the terminal using signaling.

For more detailed descriptions of the first interference parameter, refer to S230 in FIG. 2.

In the foregoing event-triggered interference reporting method, the terminal reports interference to the network device only when a specific condition is met, so that the interference reporting overheads are reduced.

Figure 4:
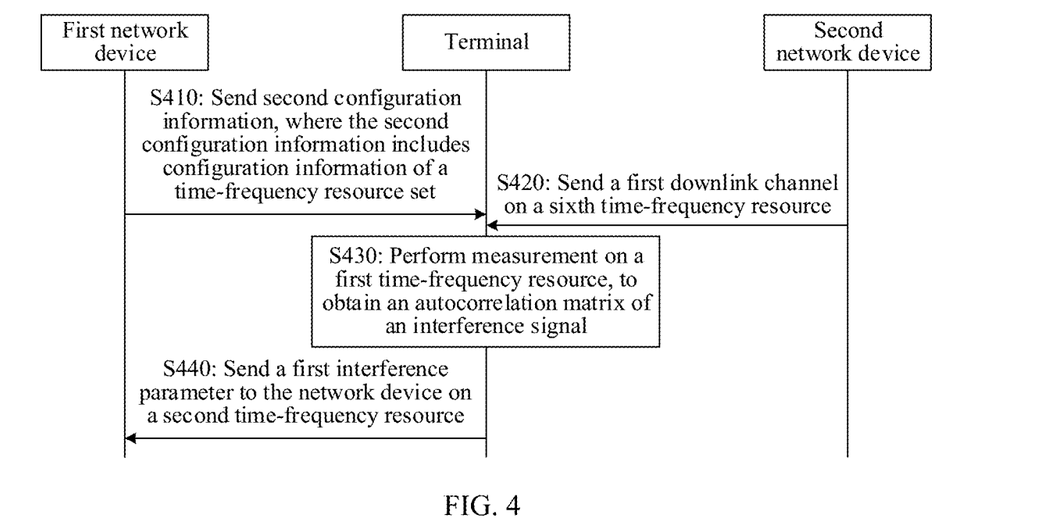
FIG. 4 is a schematic flowchart of an interference tracing method according to an embodiment of this application.

As shown in FIG. 4, an embodiment of this application provides an interference tracing method.

S410: A first network device sends second configuration information to a terminal, where the second configuration information includes configuration information of a time-frequency resource set, or the second configuration information indicates a time-frequency resource set. Correspondingly, the terminal receives the second configuration information from the first network device. The first network device herein may be the network device in FIG. 2 and FIG. 3.

Specifically, the time-frequency resource set is a time-frequency resource used by the terminal to perform blind detection on a downlink channel (for example, a PDCCH) from a second network device. The first network device is a network device that provides signaling and data transmission for the terminal, and the second network device is a network device that causes interference to a signal received by the terminal from the first network device.

Optionally, the first network device sends first configuration information to the terminal. For detailed descriptions of the first configuration information, refer to S310.

S420: The second network device sends a first downlink channel to the terminal on a sixth time-frequency resource, and correspondingly, the terminal performs blind detection on the first downlink channel on the sixth time-frequency resource, where the first downlink channel carries interference change indication information. The sixth time-frequency resource herein is a time-frequency resource in the foregoing time-frequency resource set. The first downlink channel is a downlink channel sent by the second network device to the terminal.

Specifically, the interference change indication information herein indicates whether the terminal needs to measure the interference from the second network device, or indicates the terminal to measure the interference from the second network device.

Optionally, the first downlink channel further carries indication information of the first time-frequency resource. For specific descriptions of the first time-frequency resource, refer to related descriptions in S210 or S310.

Optionally, the first downlink channel further carries indication information of a second time-frequency resource. For specific descriptions of the second time-frequency resource, refer to related descriptions in S230 or S310.

Optionally, the first downlink channel further carries a fifth time length, and the fifth time length indicates effective time of current interference measurement. To be specific, in the fifth time length, the terminal does not need to measure interference from the second network device.

S430: The terminal performs measurement on the first time-frequency resource, to obtain an autocorrelation matrix of interference on the signals received by the terminal on N receive antennas, where N is an integer greater than 1. For a related process, refer to related descriptions of S220 in FIG. 2.

S440: The terminal sends a first interference parameter to the first network device on the second time-frequency resource, where the first interference parameter is determined based on the autocorrelation matrix of the interference signal. Correspondingly, the first network device receives the first interference parameter from the terminal device on the second time-frequency resource.

For detailed descriptions of the first interference parameter, refer to S230.

In the foregoing interference tracing method, when an interference from the second network device with the terminal changes, the second network device sends the first downlink channel to the terminal, to indicate to the terminal to measure the interference from the second network device, so that the terminal measures the interference only when the interference changes, and interference measurement overheads of the terminal can be reduced.

It may be understood that, to implement the functions in the foregoing embodiment, the network device and the terminal include corresponding hardware structures and/or software modules for performing the functions. A person skilled in the art should easily be aware that, in combination with the units and the method steps in the examples described in embodiments disclosed in this application, this application can be implemented by hardware or a combination of hardware and computer software. Whether a function is performed by hardware or hardware driven by computer software depends on particular application scenarios and design constraints of the technical solutions.

Figure 5:
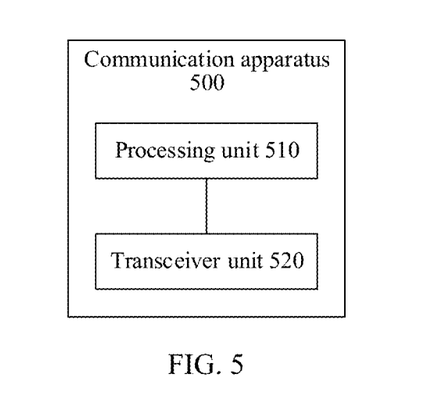
FIG. 5 is a schematic diagram of a structure of a communication apparatus according to an embodiment of this application.
Figure 6:
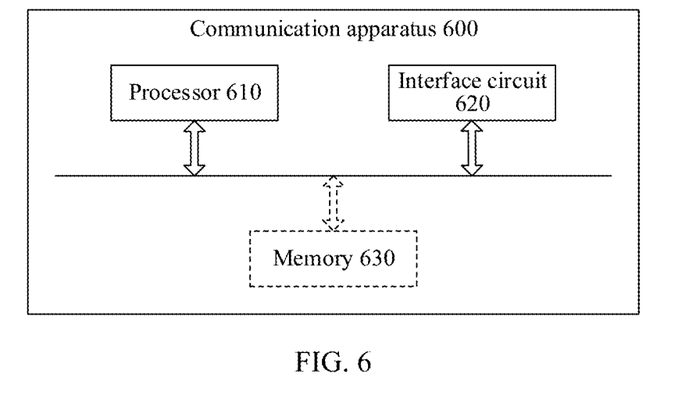
FIG. 6 is a schematic diagram of a structure of another communication apparatus according to an embodiment of this application.

FIG. 5 and FIG. 6 are schematic diagrams of structures of possible communication apparatuses according to embodiments of this application. These communication apparatuses may be configured to implement functions of the terminal or the network device in the foregoing method embodiments, and therefore may also implement beneficial effects of the foregoing method embodiments. In embodiments of this application, the communication apparatus may be the terminal 130 or the terminal 140 shown in FIG. 1, or may be the radio access network device 120 shown in FIG. 1, or may be a module (such as a chip) used in the terminal or the network device.

As shown in FIG. 5, a communication apparatus 500 includes a processing unit (e.g., one or more processors or one or more circuits) 510 and a transceiver unit 520. The communication apparatus 500 is configured to implement the function of the terminal or the network device in the method embodiment shown in FIG. 2, FIG. 3, or FIG. 4. The term "unit" herein may refer to hardware components or software modules or software and hardware.

When the communication apparatus 500 is configured to implement the function of the terminal in the method embodiment shown in FIG. 2, the transceiver unit 520 is configured to receive first information from a network device, where the first information indicates a first time-frequency resource; the processing unit 510 is configured to perform measurement on the first time-frequency resource, to obtain interference information of the terminal on N receive antennas, where N is an integer greater than 1; and the transceiver unit 520 is further configured to send a first interference parameter to the network device on a second time-frequency resource, where the first interference parameter is determined based on the interference information.

When the communication apparatus 500 is configured to implement the function of the network device in the method embodiment shown in FIG. 2, the transceiver unit 520 is configured to send first information to a terminal, where the first information indicates a first time-frequency resource; the transceiver unit 520 is further configured to receive a first interference parameter from the terminal on a second time-frequency resource, where the first interference parameter is determined based on interference information of the terminal on N receive antennas, and the interference information is obtained through measurement on the first time-frequency resource; and the processing unit 510 is configured to schedule downlink data based on the first interference parameter.

For more detailed descriptions of the processing unit 510 and the transceiver unit 520, refer to related descriptions in the method embodiment shown in FIG. 2. Details are not described herein again.

When the communication apparatus 500 is configured to implement a function of the terminal in the method embodiment shown in FIG. 3, the transceiver unit 520 is configured to receive first configuration information from a network device, where the first configuration information indicates a first time-frequency resource and a second time-frequency resource, the first time-frequency resource is a time-frequency resource for interference measurement, and the second time-frequency resource is a time-frequency resource for interference reporting; the processing unit 510 is configured to perform measurement on the first time-frequency resource to obtain an autocorrelation matrix of interference signals received by the terminal on N receive antennas, where N is an integer greater than 1; and the transceiver unit 520 is further configured to: when an interference reporting mode is event-triggered aperiodic reporting and a second condition is met, send a first interference parameter to the network device on the second time-frequency resource, where the first interference parameter is determined based on the autocorrelation matrix of the interference signal.

When the communication apparatus 500 is configured to implement the function of the network device in the method embodiment shown in FIG. 3, the transceiver unit 520 is configured to send first configuration information to a terminal, where the first configuration information indicates a first time-frequency resource and a second time-frequency resource, the first time-frequency resource is a time-frequency resource for interference measurement, and the second time-frequency resource is a time-frequency resource for interference reporting; the transceiver unit 520 is further configured to receive a first interference parameter from the terminal on the second time-frequency resource, where the first interference parameter is determined based on an autocorrelation matrix of interference signals received by the terminal on N receive antennas, and the interference signals are obtained through measurement on the first time-frequency resource; and the processing unit 510 is configured to schedule downlink data based on the first interference parameter.

For more detailed descriptions of the processing unit 510 and the transceiver unit 520, refer to related descriptions in the method embodiment shown in FIG. 3. Details are not described herein again.

When the communication apparatus 500 is configured to implement the function of the terminal in the method embodiment shown in FIG. 4, the transceiver unit 520 is configured to receive second configuration information from a first network device, where the second configuration information includes configuration information of a time-frequency resource set or the second configuration information indicates a time-frequency resource set; the transceiver unit 520 is further configured to perform blind detection on a first downlink channel on a sixth time-frequency resource, where the first downlink channel carries interference change indication information; the processing unit 510 is configured to perform measurement on a first time-frequency resource, to obtain an autocorrelation matrix of interference on the signals received by the terminal on N receive antennas, where N is an integer greater than 1; and the transceiver unit 520 is further configured to send a first interference parameter to the first network device on a second time-frequency resource, where the first interference parameter is determined based on the autocorrelation matrix of the interference signal.

When the communication apparatus 500 is configured to implement functions of the first network device in the method embodiment shown in FIG. 4, the transceiver unit 520 is configured to send second configuration information to a terminal, where the second configuration information includes the configuration information of a time-frequency resource set or the second configuration information indicates a time-frequency resource set; the transceiver unit 520 is further configured to receive a first interference parameter from the terminal on a second time-frequency resource, where the first interference parameter is determined based on an autocorrelation matrix of interference signals received by the terminal on N receive antennas, and the interference signal is obtained through measurement on the first time-frequency resource; and the processing unit 510 is configured to schedule downlink data based on the first interference parameter.

When the communication apparatus 500 is configured to implement functions of the second network device in the method embodiment shown in FIG. 4, the transceiver unit 520 is configured to send a first downlink channel to a terminal on a sixth time-frequency resource, where the first downlink channel carries interference change indication information.

For more detailed descriptions of the processing unit 510 and the transceiver unit 520, refer to related descriptions in the method embodiment shown in FIG. 4. Details are not described herein again.

As shown in FIG. 6, a communication apparatus 600 includes a processor 610 and an interface circuit 620. The processor 610 and the interface circuit 620 are coupled to each other. It may be understood that the interface circuit 620 may be a transceiver or an input/output interface. Optionally, the communication apparatus 600 may further include a memory 630, configured to: store instructions to be executed by the processor 610, store input data required by the processor 610 to run the instructions, or store data generated after the processor 610 runs the instructions.

When the communication apparatus 600 is configured to implement the method shown in FIG. 2, FIG. 3, or FIG. 4, the processor 610 is configured to implement a function of the processing unit 510, and the interface circuit 620 is configured to implement a function of the transceiver unit 520.

When the communication apparatus is a chip used in a terminal, the terminal chip implements the functions of the terminal in the foregoing method embodiments. The terminal chip receives information from another module (for example, a radio frequency module or an antenna) in the terminal, where the information is sent by a network device to the terminal; or the terminal chip sends information to another module (for example, a radio frequency module or an antenna) in the terminal, where the information is sent by the terminal to a network device.

When the communication apparatus is a chip used in a network device, the network device chip implements the functions of the network device in the foregoing method embodiments. The network device chip receives information from another module (for example, a radio frequency module or an antenna) in the network device, where the information is sent by a terminal to the network device; or the network device chip sends information to another module (for example, a radio frequency module or an antenna) in the network device, where the information is sent by the network device to a terminal.

It may be understood that the processor in embodiments of this application may be a central processing unit (CPU), may be another general-purpose processor, a digital signal processor (DSP), an application-specific integrated circuit (ASIC), a field programmable gate array (FPGA), another programmable logic device, a transistor logic device, a hardware component, or any combination thereof. The general purpose processor may be a microprocessor or any regular processor or the like.

The method steps in embodiments of this application may be implemented in a hardware manner, or may be implemented in a manner of executing software instructions by the processor. The software instructions may include a corresponding software module. The software module may be stored in a random access memory, a flash memory, a read-only memory, a programmable read-only memory, an erasable programmable read-only memory, an electrically erasable programmable read-only memory, a register, a hard disk, a removable hard disk, a CD-ROM, or any other form of storage medium well-known in the art. For example, a storage medium is coupled to a processor, so that the processor can read information from the storage medium, and can write information into the storage medium. Certainly, the storage medium may alternatively be a component of the processor. The processor and the storage medium may be disposed in an ASIC. In addition, the ASIC may be located in a network device or a terminal. Certainly, the processor and the storage medium may alternatively exist in the network device or the terminal as discrete assemblies.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer programs or instructions. When the computer programs or the instructions are loaded and executed on a computer, the procedures or the functions according to embodiments of this application are all or partially implemented. The computer may be a general-purpose computer, a dedicated computer, a computer network, a network device, user equipment, or another programmable apparatus. The computer program or instructions may be stored in a computer-readable storage medium or may be transmitted from a computer-readable storage medium to another computer-readable storage medium. For example, the computer program or instructions may be transmitted from a website, computer, server, or data center to another website, computer, server, or data center in a wired or wireless manner. The computer-readable storage medium may be any usable medium accessible by a computer, or a data storage device, such as a server or a data center, integrating one or more usable media. The usable medium may be a magnetic medium, for example, a floppy disk, a hard disk, or a magnetic tape; may be an optical medium, for example, a digital video disc; or may be a semiconductor medium, for example, a solid-state drive.

In embodiments of this application, unless otherwise stated or there is a logic conflict, terms and/or descriptions in different embodiments are consistent and may be mutually referenced, and technical features in different embodiments may be combined based on an internal logical relationship thereof, to form a new embodiment.

In this application, "at least one" means one or more, and "a plurality of" means two or more. The term "and/or" describes an association relationship between associated objects, and indicates that three relationships may exist. For example, A and/or B may indicate the following cases: Only A exists, both A and B exist, and only B exists, where A and B may be singular or plural. In the text descriptions of this application, the character "/" generally indicates an "or" relationship between the associated objects. In a formula in this application, the character "/" indicates a "division" relationship between the associated objects.

It may be understood that various numbers in embodiments of this application are merely used for differentiation for ease of description, and are not used to limit the scope of embodiments of this application. Sequence numbers of the foregoing processes do not mean execution sequences. The execution sequences of the processes should be determined based on functions and internal logic of the processes.

What is claimed is:

1. An apparatus comprising:
   at least one processor; and
   a computer readable medium storing a program executable by the at least one processor, the program comprising instructions that, when executed, cause the apparatus to perform:
   receiving first information from a network device, wherein the first information indicates a first time-frequency resource;
   performing measurement on the first time-frequency resource, to obtain interference information of a terminal device on N receive antennas, wherein N is an integer greater than 1; and
   sending a first interference parameter to the network device on a second time-frequency resource, wherein the first interference parameter is determined based on the interference information,
   wherein the first interference parameter comprises at least one of an interference layer indicator (ILI), an interference matrix indicator (IMI), or an interference strength indicator (ISI), wherein the ILI indicates a value L, L is a nonnegative integer less than or equal to N, the IMI is determined based on a first vector set $\{u_1, u_2, \ldots, u_N\}$, the first vector set comprises N vectors, the ISI is determined based on a first value set $\{\lambda_1, \lambda_2, \ldots, \lambda_N\}$, the first value set comprises N values, the first value set and the first vector set are determined based on the interference information, and $\lambda_1 \geq \lambda_2 \geq \ldots \geq \lambda_N$; and
   wherein the IMI is determined based on a first interference matrix $U_I$ and a first codebook and the first interference matrix $U_I = [u_1, u_2, \ldots, u_L]$.

2. The apparatus according to claim 1, wherein the interference information is an autocorrelation matrix R of interference on signals received by the terminal device on the N receive antennas, and the first value set and the first vector set meet: $R = U\Sigma U^H$, wherein a matrix $U = [u_1, u_2, \ldots, u_N]$, $\Sigma = \text{Diag}(\lambda_1, \lambda_2, \ldots, \lambda_N)$, $U^H$ represents a conjugate transposed matrix of the matrix U, and $\text{Diag}(\lambda_1, \lambda_2, \ldots, \lambda_N)$ represents a diagonal matrix whose main diagonal elements are $\lambda_1, \lambda_2, \ldots, \lambda_N$.

3. The apparatus according to claim 1, wherein L is equal to a quantity of elements $\lambda_i$ that are in the first value set and whose values are greater than or equal to a first threshold, and i is a positive integer less than or equal to N.

4. The apparatus according to claim 1, wherein the instructions further cause the apparatus to perform:

sending a first reference signal to the network device, wherein a precoding matrix of the first reference signal is an identity matrix; and sending a second reference signal to the network device, wherein a precoding matrix of the second reference signal is a first interference matrix $U_I$, and the first interference matrix $U_I=[i_1, u_2, \ldots, u_L]$.

5. A method, applied to a communication apparatus, and comprising:

sending first information to a terminal device, wherein the first information indicates a first time-frequency resource; and receiving a first interference parameter from the terminal device on a second time-frequency resource, wherein the first interference parameter is determined based on interference information on N receive antennas of the terminal device, and the interference information is obtained through measurements on the first time-frequency resource, wherein the first interference parameter comprises at least one of an interference layer indicator (ILI), an interference matrix indicator (IMI), or an interference strength indicator (ISI), wherein the ILI indicates a value L, L is a nonnegative integer less than or equal to N, the IMI is determined based on a first vector set $\{u_1, u_2, \ldots, u_N\}$, the first vector set comprises N vectors, the ISI is determined based on a first value set $\{\lambda_1, \lambda_2, \ldots, \lambda_N\}$, the first value set comprises N values, the first value set and the first vector set are determined based on the interference information, and $\lambda_1 \geq \lambda_2 \geq \ldots \geq \lambda_N$; and wherein the IMI is determined based on a first interference matrix $U_I$ and a first codebook and the first interference matrix $U_I=[u_1, u_2, \ldots, u_L]$.

6. The method according to claim 5, wherein the interference information is an autocorrelation matrix R of interference on signals received by the terminal device on the N receive antennas, and the first value set and the first vector set meet: $R=U\Sigma U^H$, wherein a matrix $U=[u_1, u_2, \ldots, u_N]$, $\lambda = \text{Diag}(\lambda_1, \lambda_2, \ldots, \lambda_N)$, $U^H$ represents a conjugate transposed matrix of the matrix U, and $\text{Diag}(\lambda_1, \lambda_2, \ldots, \lambda_N)$ represents a diagonal matrix whose main diagonal elements are $\lambda_1, \lambda_2, \ldots, \lambda_N$.

7. The method according to claim 5, wherein L is equal to a quantity of elements $\lambda_i$ that are in the first value set and whose values are greater than or equal to a first threshold, and i is a positive integer less than or equal to N.

8. The method according to claim 5, wherein the method further comprises:

receiving a first reference signal from the terminal device, wherein a precoding matrix of the first reference signal is an identity matrix; and receiving a second reference signal from the terminal device, wherein a precoding matrix of the second reference signal is a first interference matrix $U_I$, and the first interference matrix $U_I=[u_1, U_2, \ldots, U_L]$.

9. An apparatus comprising:

at least one processor; and a computer readable medium storing a program executable by the at least one processor, the program comprising instructions that, when executed by the at least one processor, cause the apparatus to perform:

sending first information to a terminal device, wherein the first information indicates a first time-frequency resource; and receiving a first interference parameter from the terminal device on a second time-frequency resource, wherein the first interference parameter is determined based on interference information on N receive antennas of the terminal device, and the interference information is obtained through measurements on the first time-frequency resource;

wherein the first interference parameter comprises at least one of an interference layer indicator (ILI), an interference matrix indicator (IMI), or an interference strength indicator (ISI), wherein the ILI indicates a value L, L is a nonnegative integer less than or equal to N, the IMI is determined based on a first vector set $\{u_1, u_2, \ldots, u_N\}$, the first vector set comprises N vectors, the ISI is determined based on a first value set $\{\lambda_1, \lambda_2, \ldots, \lambda_N\}$, the first value set comprises N values, the first value set and the first vector set are determined based on the interference information, and $\lambda_1 \geq \lambda_2 \geq \ldots \geq \lambda_N$; and wherein the IMI is determined based on a first interference matrix $U_I$ and a first codebook and the first interference matrix $U_I=[u_1, u_2, \ldots, u_L]$.

10. The apparatus according to claim 9, wherein the interference information is an autocorrelation matrix R of interference signals received by the terminal device on the N receive antennas, and the first value set and the first vector set meet: $R=U\Sigma U^H$, wherein a matrix $U=[u_1, u_2, \ldots, U_N]$, $\Sigma=\text{Diag}(\lambda_1, \lambda_2, \ldots, \lambda_N)$, $U^H$ represents a conjugate transposed matrix of the matrix U, and $\text{Diag}(\lambda_1, \lambda_2, \ldots, \lambda_N)$ represents a diagonal matrix whose main diagonal elements are $\lambda_1, \lambda_2, \ldots, \lambda_N$.

11. The apparatus according to claim 9, wherein L is equal to a quantity of elements $\lambda_i$ that are in the first value set and whose values are greater than or equal to a first threshold, and i is a positive integer less than or equal to N.

12. The apparatus according to claim 9, wherein the instructions cause the apparatus to further perform:

receiving a first reference signal from the terminal device, wherein a precoding matrix of the first reference signal is an identity matrix; and receiving a second reference signal from the terminal device, wherein a precoding matrix of the second reference signal is a first interference matrix $U_I$, and the first interference matrix $U_I=[u_1, u_2, \ldots, u_L]$.

* * * * *